United States Patent [19]

Helwig

[11] 4,096,545

[45] Jun. 20, 1978

[54] ELECTRICAL APPLIANCE WITH ADAPTER SEATABLE UPON A BASE UNIT

[76] Inventor: Emmy Helwig, Gladbacher Strasse 224, D-5151 Esch, Germany

[21] Appl. No.: 765,822

[22] Filed: Feb. 4, 1977

[30] Foreign Application Priority Data

Feb. 5, 1976 Germany ............................ 2605129

[51] Int. Cl.[2] ............................................ H02B 1/16

[52] U.S. Cl. ................................ 361/380; 200/51.09; 307/140; 307/149

[58] Field of Search ............... 361/331, 380, 392, 393, 361/179; 200/51.09; 307/112, 113, 115, 116, 139, 140, 142, 149

[56] References Cited

U.S. PATENT DOCUMENTS

| | | | |
|---|---|---|---|
| 3,337,778 | 8/1967 | Becker | 361/179 |
| 3,368,110 | 2/1968 | Taylor | 307/112 |
| 4,007,378 | 2/1977 | Lazzara | 307/112 |
| 4,053,724 | 10/1977 | Llona | 361/331 |

*Primary Examiner*—Gerald P. Tolin
*Attorney, Agent, or Firm*—Michael J. Striker

[57] ABSTRACT

A cordless electrical appliance is provided with an adapter unit and the two of them can be rested upon a base unit. The base unit has contacts connected to a supply voltage, and includes an appliance-current path with appliance-current-path contacts, and an auxiliary-current path with auxiliary-current-path contacts. The base unit includes a step-down transformer whose primary is connected across the voltage-supply contacts and whose secondary is connected in the auxiliary current path. The auxiliary current path includes a relay winding which controls a relay switch in the appliance-current path. Both the adapter unit and the base unit are provided with grounding devices. The adapter unit is likewise provided with appliance-current-path contacts. When the appliance with its adapter unit is seated upon the base unit, in a particular predetermined position, the appliance-current-path contacts of the two units engage, and connecting means on the adapter unit bridge the auxiliary-current-path contacts of the base unit, thereby energizing the relay winding and closing the relay switch in the appliance-current path, and the grounding devices of the two units become electrically connected to each other.

12 Claims, 6 Drawing Figures

ELECTRICAL APPLIANCE WITH ADAPTER SEATABLE UPON A BASE UNIT

BACKGROUND OF THE INVENTION

The invention relates to elecrical appliances, such as household or industrial appliances.

More particularly, the invention relates to the powering of such appliances.

Conventionally, the appliances used in a particular household or industrial installation are each provided with their own connecting cords, for example cords provided with plugs which can be inserted into wall sockets, or the like. Generally, the appliances, whether household or industrial, are also provided with grounding lines and grounding contacts which must be properly connected to grounding terminals in the household or plant. Examples of household appliances of the type in question would include coffee grinders, mixers, meat grinders, kitchen machines, fruit pressers, and so forth.

SUMMARY OF THE INVENTION

It is a general object of the invention to provide a plurality of such electrical appliances with a common base unit. The base unit will be provided with a cord which can be plugged into a wall socket, or otherwise connected to a suitable power supply. The individual appliances, however, will be cordless and can be powered by merely placing them on the base unit in a proper position.

This object, and others which will become more understandable from the description, below, of preferred embodiments can be met, according to one advantageous concept of the invention, by providing in combination a cordless electrical appliance, an adapter unit for the appliance, and a base unit. The adapter unit is either permanently or removably attached to the appliance. The base unit is provided with supply-voltage-connection contacts for connection to a supply voltage, and with two appliance-current-path contacts. The base unit contains an appliance-current path connected between the supply-voltage-connection contacts and the appliance-current-path contacts. The base unit also contains a step-down transformer having a primary winding connected across the supply-voltage-connection contacts and having a secondary winding. The base unit includes an auxiliary current path connected across the secondary winding, and is provided with two auxiliary-current-path contacts connected in the auxiliary current path and serving to close the auxiliary current path when electrically connected together. Connected in the auxiliary current path is a relay winding controlling the operation of a relay switch connected in the appliance-current path, the relay winding closing the relay switch when the auxiliary current path is closed. The base unit also contains grounding means for connection to ground. The adapter unit is provided with two appliance-current-path contacts electrically connected to the internal circuitry of the electrical appliance, and with connecting means for connecting together the two auxiliary-current-path contacts of the base unit. Also, the adapter unit is provided with grounding means for grounding the appliance. The base unit and adapter unit are so configured, and the contacts and grounding means of the base unit, and the contacts, grounding means and connecting means of the adapter unit are so located on the base unit and the adapter unit, respectively, that when the adapter unit is placed upon the base unit in a single predetermined position, the appliance-current-path contacts of the adapter unit engage those of the base unit, the connecting means of the adapter unit electrically connects together the auxiliary-current-path contacts of the base unit, and the grounding means of the adapter unit becomes electrically connected to the grounding means of the base unit.

According to another advantageous concept of the invention, the grounding means of the adapter unit is electrically connected to the connecting means of the adapter unit, and the grounding means of the base unit is electrically connected to one of the two auxiliary-current-path contacts of the base unit. This makes for a high degree of safety and reliability with respect to proper grounding of the electrical appliance. The appliance-current-path within the base unit cannot be closed until the relay switch therein closes. The relay switch does not close until the relay winding in the auxiliary current path is energized. The auxiliary current path cannot be closed until the auxiliary-current-path contacts on the base unit are connected together. Thus, the closing of the appliance-current path necessarily occurs only when the grounding means of the adapter unit and the grounding means of the base unit have become electrically connected to each other. Likewise, if as a result of dirtying of contacts, the establishment of proper grounding is prevented, then necessarily the closing of the appliance-current path is likewise prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
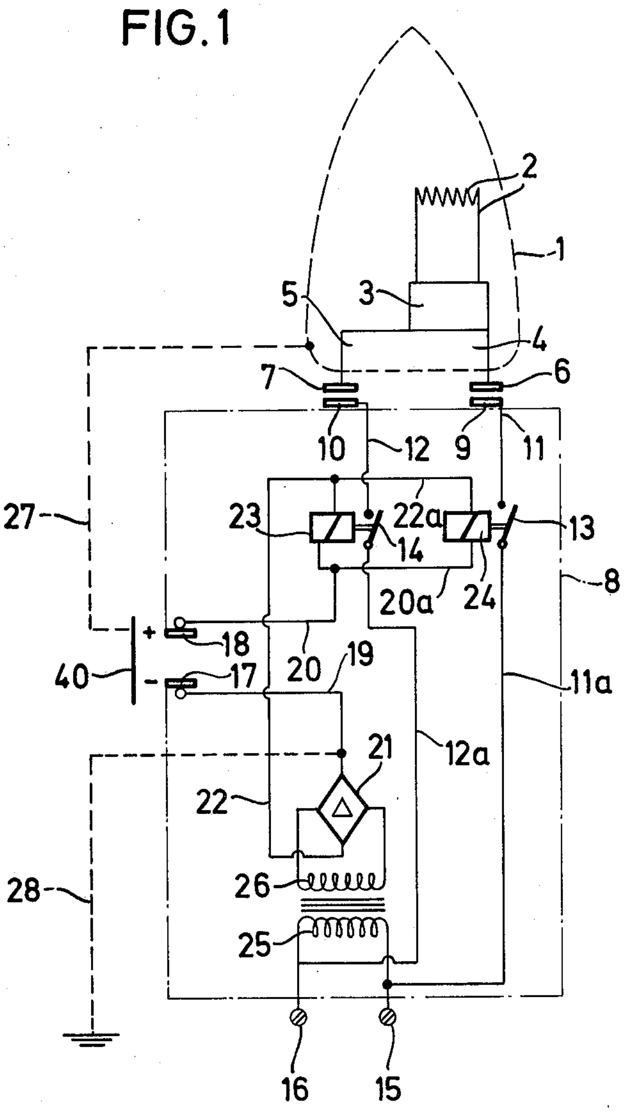
FIG. 1 depicts the circuitry of one embodiment of the invention.

FIG. 1 depicts the circuitry employed in one exemplary embodiment of the invention. A household appliance 1, here a flat iron shown in broken lines standing upon its end, or alternatively a coffee maker, or the like, comprises an internal heating resistor 2 and internal electrical connections. The appliance 1 additionally includes a thermostatic temperature regulator 3, a non-illustrated indicator lamp, and the like. The appliance 1 is provided with two fixedly located electrodes 6 and 7; these may be electrical contacts, plugs or sockets. Electrodes 6 and 7 are internally connected, by means of leads 4, 5 with the thermostatic regulator 3 and the heating resistor 4. Contacts 6, 7 are located within an adapter, described further below. The adapter is permanently attached to the appliance or, preferably, removably attached thereto and interchangeable as between a plurality of appliances. The adapter is provided with a metal plate 40 which, in a manner described below, serves to bridge two electrical contacts and thereby close an auxiliary circuit for energizing a relay device located within the base unit 8, when the appliance, with the adapter attached thereto, is placed upon the base unit 8, properly positioned relative thereto.

In FIG. 1, the circuitry contained within the base unit 8 is enclosed by dash-dot lines. The base unit 8 is provided at its upper end with two insulated fixedly located contacts 9, 10. These are connected, via electrical lines 11, 11*a* and 12, 12*a* to the household power supply, or more particularly to the connecting terminals 15, 16 which are connected to the household power supply. Connected in each of these two connecting lines is a respective one of two normally open relay switches 13, 14, cooperating with relay windings 23, 24. Alternatively, use could be made of a single relay winding cooperating with two normally open relay switches; this latter possibility is discussed with respect to FIG. 2. When the appliance 1 is removed from the base unit 8, the normally open switches 13, 14 are open, so that contacts 9, 10 will be unable to conduct current.

The base unit 8 additionally is provided with contacts 17, 18 across which a potential difference is established when the base unit is connected to the houshold power supply, e.g., by being plugged into a wall socket. Preferably, this potential difference is selected to be 24 volts. For reasons of safety, it is preferable that this voltage be a D.C. voltage. To this end, contact 17 is connected via a line 19 to an output terminal of a rectifier 21 which, in turn, is connected across the secondary winding 26 of a transformer. The other contact 18 is connected via an electrical line 20 to the relay winding of the base unit, and in the embodiment of FIG. 1 is connected via electrical lines 20, 20*a* to the respective relay windings 23, 24. Relay windings 23, 24 are connected via lines 22, 22*a* to the other output terminal of rectifier 21. The primary winding 25 of the transformer is connected across the household voltage, in particular across the connecting terminals 15, 16 of the base unit, and here is connected in parallel to the current path of the heating coil 2 referred to above.

As indicated in FIG. 1, only when metal plate 40 bridges electrical contacts 17, 18 is voltage applied across the relay windings 23, 24, whereupon the cooperating normally open relay switches 13, 14 close, so that the household voltage will become applied across contacts 9 and 10, for example a household voltage of 220 volts A.C. When the appliance 1 with its adapter attached thereto is placed upon the base unit 8, the metal plate 40 bridges contacts 17, 18, and the insulted electrodes 6, 7 engage the insultated electrodes 9, 10. As a result, the heating operation is automatically performed. When the appliance is then lifted off the base unit 8, the relay windings 23, 24 become automatically deenergized, and the normally open switches 13, 14 reassume their open settings.

As indicated in FIG. 1, a safety contact line 27 is connected between the electric appliance 1 and the metal plate 40. A further safety contact line or grounding line 28 is connected to the line 19 between the rectifier stage 21 and the contact 17 of the auxiliary current path. These interconnections provide the advantage that a grounding of the electric appliance is always assured whenever the contacts 17, 18 are bridged by the metal plate 40 as a result of resting the appliance with its adapter upon the base unit and voltage is applied across the relay windings. The relay windings then close their associated switches and the actual main current path of the electric appliance can be closed.

Figure 2:
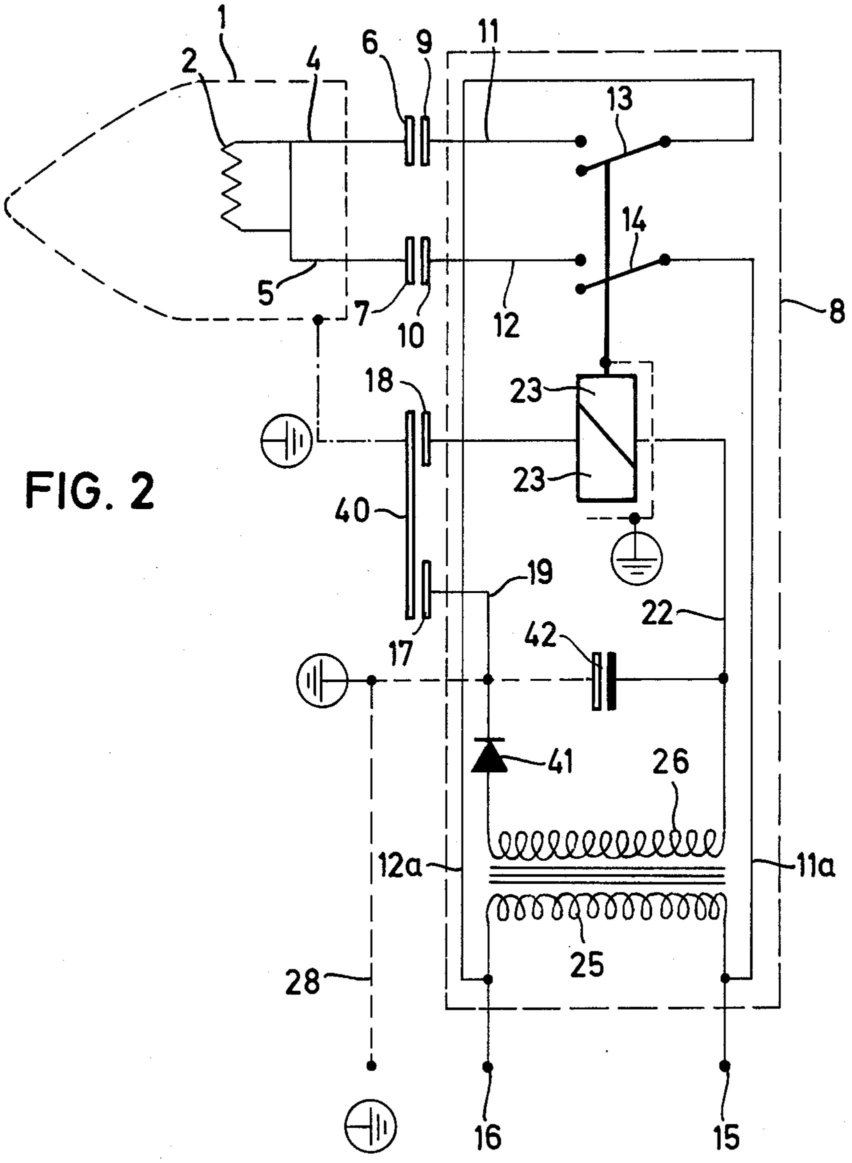
FIG. 2 depicts the circuitry of another embodiment of the invention.

FIG. 2 depicts the circuitry of another exemplary embodiment of the invention, corresponding to a great extent to that of FIG. 1, with corresponding circuit components being denoted by the same reference numerals as employed in FIG. 1. In FIG. 2, instead of the two relay windings 23, 24 of FIG. 1, only a single relay winding 23 is provided, operative for controlling the settings of both contacts 13, 14 of the main current path of the appliance. Furthermore, instead of the rectifier stage 21 of FIG. 1, use is made of a diode 41, or of another suitable semiconductor element. Also, a capacitor 42 is connected in parallel across the secondary winding 26 of the transformer.

Figure 3:
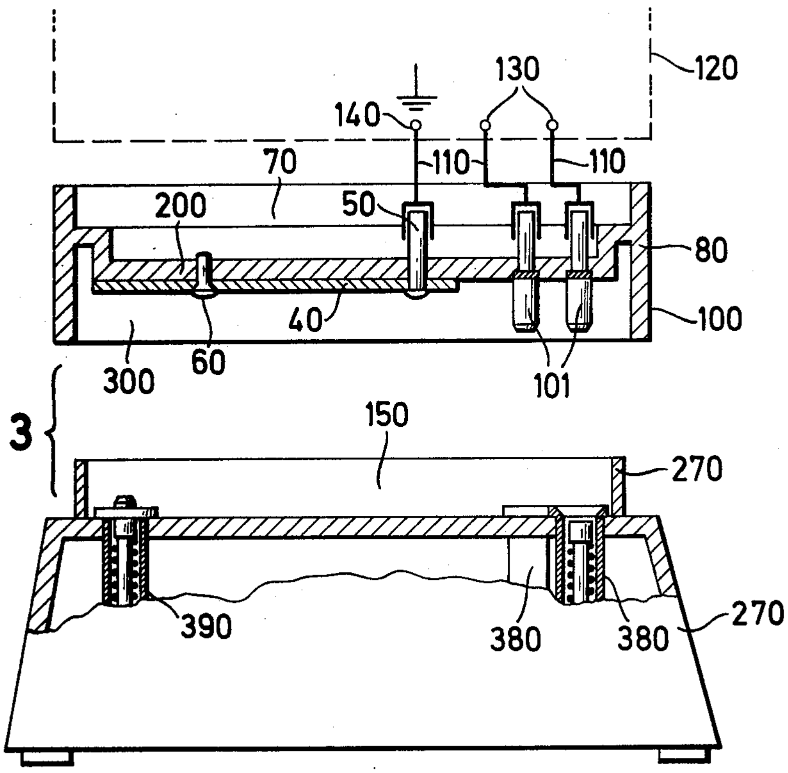
FIG. 3 is a vertical section through an adapter unit, partially illustrating also the electrical appliance to which the adapter unit is attached, the adapter unit being shown as it is being lowered into proper position on the base unit.

FIG. 3 is a vertical section through an exemplary embodiment of the adapter shown being lowered towards its proper position of rest upon the base unit. An electric appliance 120 is provided, in conventional manner, with internal contacts 130 for operating current and with a grounding contact line 140, as well as with electrical connecting leads 110. The adapter 100 is comprised of an outer wall 80 and a middle separating wall 200. The adapter is so designed as to correspond to the positive shape and the recess 150 of the base unit 270, the recess 150 being bounded by an upwardly projecting rim 270*a*.

When the adapter is stood upon the base unit, it can assume only one positive position. The separating wall 200 subdivides the interior of the adapter 100 into an upper chamber 70 and a lower chamber 300. In the lower chamber 300 there are located the electrodes 101 which carry the household current. These are so mounted that, when the adapter 100 is rested upon the base unit 270, the contacts 101 fit exactly into the electrically insulated contacts 380 of the base unit 270. Also, these contacts 101 are of a length such that they pass through the separating wall 200 into the upper chamber 70 by means of the electrical connecting leads 110 of the electric appliance 120 are connected with the contacts 130. The metal plate 40 is secured to the lower side of the separating wall 200 of the adapter 100 by means of a screw 60, and is so positioned that when the adapter 100 is received by the base unit the metal plate 40 electrically bridges the insulated contacts 390 of the base unit 270. The metal plate 40 is provided with a rivet 50 of such a length as to project through the separating wall 200 and be electrically connected with the grounding contact 140 of the electric appliance 120 by means of the electrical connecting lead 110, to assure proper grounding of the electric appliance 120 when the latter is placed upon the base unit. After this connection is established, the adapter 100 is secured tó the bottom side of the electrical appliance 120.

Figure 4:
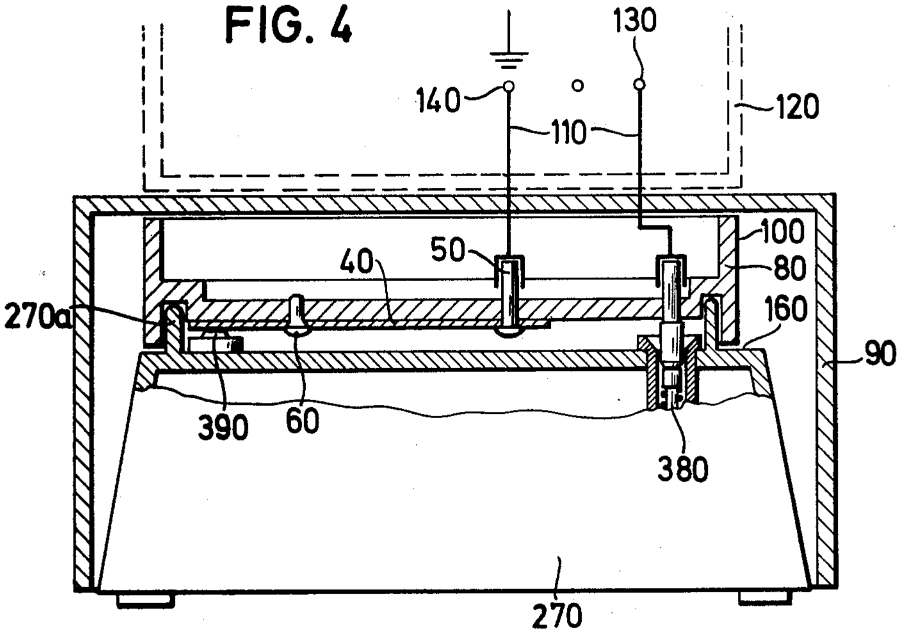
FIG. 4 is a view corresponding to FIG. 3, but with the adapter unit seated upon the base unit.

FIG. 4 depicts the position of the adapter 100 when properly seated on the base unit 270. The outer wall 80 of the adapter can be annular of another shape matching the shape of the bottom of the electrical appliance in question. In the exemplary embodiment depicted in FIGS. 5 and 6, the outer wall 80 is of circular annular shape. The diameter of this wall is so selected that it exactly rests upon the base unit 270 down to its upper side 160, thereby surrounding the upwardly projecting circular annular rim 270*a* of the base unit, and accordingly assuring a positive holding action and a single definite resting position. In the case of larger and heavier electrical appliances, the outer wall 80 of the adapter 100 is advantageously so dimensioned that the entire base unit 270 is enclosed, as indicated by numeral 90 in the drawing.

Figure 5:
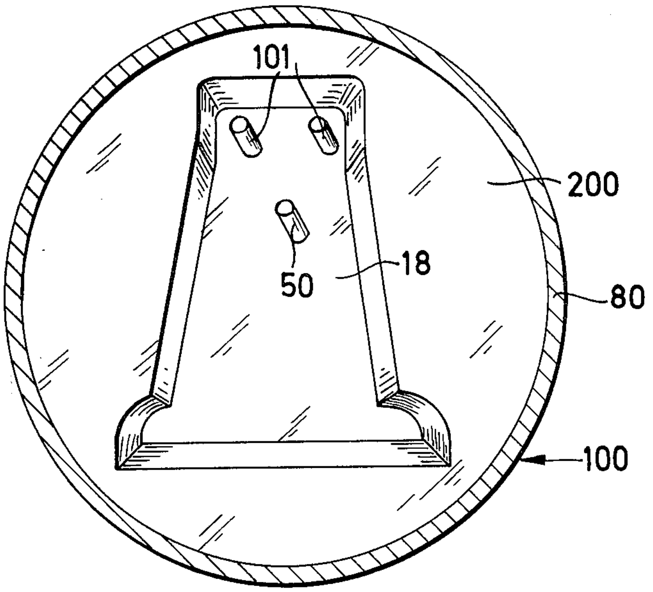
FIG. 5 is a top view of the adapter unit.

FIG. 5 depicts the adapter as seen from above with its annular wall 80 encircling its separating wall 200. In this perspective view, the upwardly projecting contacts 101 for the conduction of household current and the upwardly projecting pin 50 for the safety contact lead are clearly visible.

Figure 6:
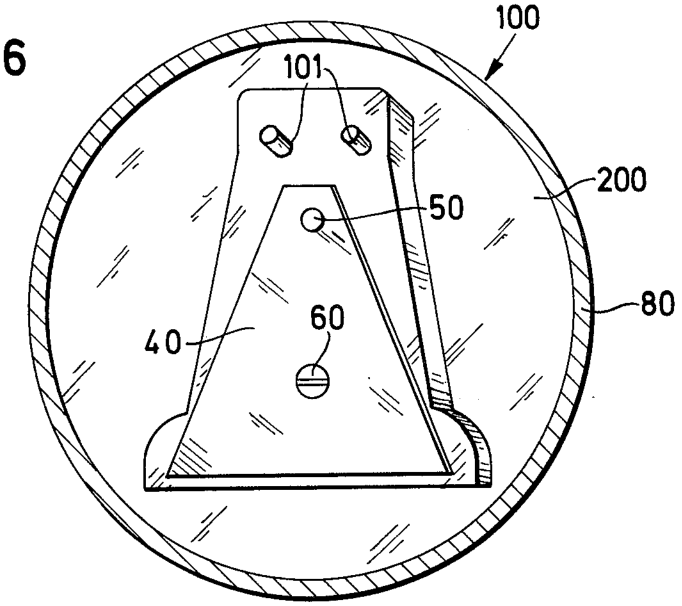
FIG. 6 is a bottom view of the adapter unit.

FIG. 6 depicts in perspective the bottom side of the adapter 100 with its annular outer wall 80 being shown in section. Clearly visible is the metal plate 40 which serves to electrically bridge the contacts 17, 18 of the auxiliary current path for the relay winding or windings. The metal plate 40 is mounted properly in place by means of a mounting screw 60 and additionally a rivet 50.

As will be clear from the foregoing, the basic concept of the invention is to so design an adapter attachable to an electrical appliance that a firm electrical connection between the appliance and a base unit can be established, not only with respect to the contacts of the main current path for the appliance, but also with repect to the grounding contact lead. The electrical connection is so designed that, when the appliance with the adapter attached thereto is lifted off the base unit, all of the electrical contacts of the latter cease to carry current and can, as a result, be physically contacted by the person using the appliance without danger. Furthermore, the electrical connections established with the circuitry described above are so designed that a current-carrying connection for the actual appliance current does not become established until after a current-carrying connection for the safety contact lead has been estahlished from the electrical appliance to the household wiring. Additionally, the inventive concepts include so designing the adapter and the base unit relative to each other as to make possible only a single well-defined positioning of the former upon the latter for establishing the various electrical connections discussed above, while simultaneously assuring a stable supporting of the electrical appliance itself.

It will be understood that each of the elements described above, or two or more together, may also find a useful application in other types of circuits and constructions differing from the types described above.

While the invention has been illustrated and described as embodied in base units receiving adapters permanently or removably attached to particular household appliances, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A combination comprising a cordless electrical appliance; an adapter unit provided on the appliance; and a base unit, supply-voltage-connection contacts on the base unit for connection to a supply voltage, two appliance-current-path contacts on the base unit, means in the base unit defining an appliance-current path connected between the supply-voltage-connection contacts and the appliance-current-path contacts, a step-down transformer in the base unit having a primary winding connected across the supply-voltage-connection contacts and having a secondary winding, means in the base unit defining an auxiliary current path connected across the secondary winding, two auxiliary-current-path contacts provided on the base unit connected in the auxiliary current path and serving to close the auxiliary current path when electrically connected together, a relay device in the base unit connected in the auxiliary current path and including a relay switch in the base unit connected in the appliance-current path, the relay device closing the relay switch when the auxiliary current path is closed, grounding means in the base unit for connection to ground, two appliance-current-path contacts on the adapter unit electrically connected to the internal circuitry of the electrical appliance, connecting means on the adapter unit for electrically connecting together the two auxiliary-current-path contacts of the base unit, grounding means in the adapter unit for grounding the electrical appliance, the base unit and the adapter being so configured, and the contacts and grounding means of the base unit and the contacts, grounding means and connecting means of the adapter unit being so located on the base unit and the adapter unit, respectively, that when the adapter unit is placed upon the base unit in a single predetermined position relative thereto, the appliance-current-path contacts of the adapter unit engage those of the base unit, the connecting means of the adapter unit electrically connects together the auxiliary-current-path contacts of the base unit, and the grounding means of the adapter unit becomes electrically connected to the grounding means of the base unit.

2. The combination defined in claim 1, the grounding means of the adapter unit being electrically connected to the connecting means of the adapter unit, the grounding means of the base unit being electrically connected to one of the auxiliary-current-path contacts of the base unit.

3. The combination defined in claim 1, the auxiliary current path including a semiconductor element.

4. The combination defined in claim 3, the semiconductor element being a rectifier element.

5. The combination defined in claim 1, the connecting means of the adapter unit being a metallic plate located to electrically bridge the auxiliary-current-path contacts of the base unit when the adapter unit assumes the predetermined position on the base unit.

6. The combination defined in claim 5, the adapter unit being provided with a boundary wall, the base unit being provided with a corresponding portion, the boundary wall fitting onto the corresponding portion when the adapter unit is placed onto the base unit in the predetermined position, the adapter unit being provided with a separating wall approximately at the middle of the boundary wall, the contacts of the adapter unit and the metallic plate of the adapter unit being provided on the separating wall, the grounding means of the adapter unit being electrically connected to the metallic plate of the adapter unit, the grounding means of the base unit being electrically connected to one of the auxiliary-current-path contacts of the base unit, whereby as the adapter unit is lowered into position onto the base unit the metallic plate cannot electrically bridge the auxiliary-current-path contacts of the base unit, and accordingly cannot effect closing of the appliance-current path by the relay switch, without simultaneously establishing an electrical connection between the grounding means of the adapter unit and the grounding means of the base unit.

7. The combination defined in claim 6, the contacts of the adapter unit being contact pins electrically connected to the internal wiring of the electrical appliance, the contacts of the base unit being contact jacks for receiving the contact pins of the adapter unit.

8. The combination defined in claim 6, the boundary wall of the adapter unit being circular, the separating wall of the adapter unit having a projecting portion of trapezoidal shape, the portion of the base unit corresponding to the boundary wall of the adapter unit likewise being circular and projecting upwardly, the circular boundary wall of the adapter unit fitting onto and at least partly surrounding the corresponding circular portion of the base unit, the base unit being provided with a recess configured to receive the trapezoidal projecting portion on the separating wall of the adapter unit.

9. The combination defined in claim 6, the separating wall of the adapter unit dividing the interior of the adapter unit into upper and lower chambers.

10. The combination defined in claim 9, the upper chamber of the adapter unit being configured to receive the lower portion of the electrical appliance, the upper chamber of the adapter unit containing connecting pins for connection to the electrical appliance and also containing a rivet securing the mounting plate on the separating wall.

11. The combination defined in claim 10, the lower chamber of the adapter unit being so configured that when the adapter unit is seated upon the base unit in the predetermined position, the upper portion of the base unit is received within the lower chamber of the adapter unit.

12. The combination defined in claim 5, the adapter unit being provided with a boundary wall and a separating wall located approximately at the middle of the boundary wall and dividing the interior of the adapter unit into upper and lower chambers, the metallic plate of the adapter unit being secured to the lower side of the separating wall and being located within the lower chamber, the location of the metallic plate and of the auxiliary-current-path contacts of the base unit being such that when the adapter unit is seated upon the base unit in the predetermined position the metallic plate bridges the auxiliary-current-path contacts of the base unit, thereby closes the auxiliary current path and energizes the relay devices, thereby causing the relay switch to close the appliance-current path.

* * * * *